Dec. 18, 1934.  W. R. C. ASHBY  1,984,562
APPARATUS FOR EVISCERATING CHICKENS AND OTHER BIRDS
Filed Nov. 22, 1933

Inventor
W. R. C. Ashby
by
atty.

Patented Dec. 18, 1934

1,984,562

UNITED STATES PATENT OFFICE 1,984,562

APPARATUS FOR EVISCERATING CHICKENS AND OTHER BIRDS

William Ross Chamberlin Ashby, Ightham, England

Application November 22, 1933, Serial No. 699,259
In Great Britain December 3, 1932

3 Claims. (Cl. 17—11)

The object of the invention is to facilitate the rapid and efficient evisceration of chickens and other birds.

The eviscerating apparatus according to the invention comprises two members, one adapted to be inserted in the carcass of the bird, and another onto which the carcass so provided may be placed, so that the two members co-operate to engage with or grip the viscera and retain it, when the carcass is drawn off the members.

The accompanying drawing illustrates one form of apparatus according to the invention, Figures 1 and 2 being, respectively, a side view and plan of the fixed frame, and Figures 3 and 4 similar views of the movable frame.

Figure 8 is a diagrammatic view illustrating more particularly the position of the initial frame in the carcass of the bird during the movement of the carcass onto the fixed frame.

Figure 1:
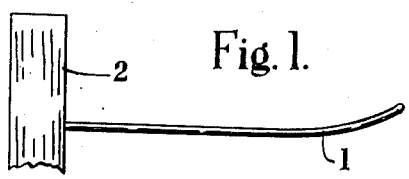
Figure 3:
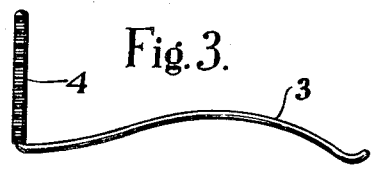
Figure 2:
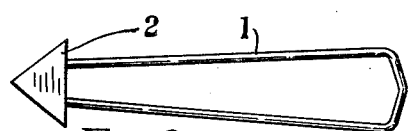
Figure 4:
Figure 5:
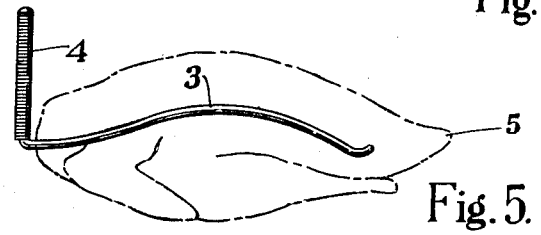
Figure 5 is a side view indicating the movable frame inserted in a carcass.

In the form illustrated, the apparatus comprises one member in the form of a wire frame or elongated loop 1. The frame 1 is fixed firmly and substantially horizontally in a stationary upright 2.

Another member in the form of an elongated looped frame 3 more bellied in the middle, narrow at the looped end and narrower still at the opposite end is provided with an upstanding handle 4 at this very narrow end.

The frame 3 is adapted to be inserted in the carcass 5 of the bird, after removal of the neck and head. After the frame 3 is inserted, it is inclined substantially to the position indicated in Figure 8, the opening in the bird through which the frames are inserted being large enough to permit of this inclination. The inclination is maintained while the bird is being thrust onto the frame 1, so that in this movement the inner end of the frame 1 will pass over the end of the frame 3 to provide more or less of an interlock on the reverse movement. The extreme inner end of the frame 1 during this movement clears the extreme end of frame 3 and when the frame 3 is moved to its operative position, as disclosed in Figure 6 of the drawing, there is a substantial interlock between the ends of the frames 1 and 3 within the bird to prevent casual separation. This is illustrated more particularly in Figure 7.

Figure 6:
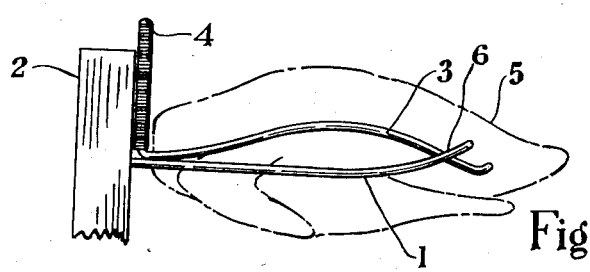
Figures 6 and 7 are a side view and plan, respectively, indicating the carcass, so prepared, placed on the fixed frame.
Figure 7:
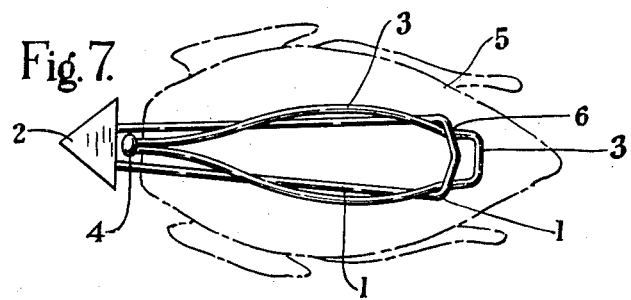

The carcass so provided with the frame 3 is then passed over the fixed frame 1 into the position indicated in Figures 6 and 7. In this position, the two frames interlock automatically, as indicated at 6, so as to grip the viscera. The operator grasps the handle 4 and may reciprocate it slightly, to ensure that the frames have interlocked, and then draws the carcass off the frames which engage with and retain the viscera, the bird being thus efficiently eviscerated practically by two simple movements of the carcass.

It will be understood that instead of the carcass being moved off the members 1 and 3, the carcass may be held stationary and the members be withdrawn with the viscera.

I claim:

1. An apparatus for eviscerating a bird, comprising a looped member, another member independent of and adapted to slide into and to co-operate with said looped member for the purpose of gripping the viscera of the bird when said members are inserted successively in the carcass of said bird and for retaining the viscera when said carcass is removed from said members.

2. An apparatus for eviscerating a bird, comprising two independent wire looped frames, one of said frames being adapted to slide into the other and to co-operate therewith for the purpose of gripping the viscera of the bird when said frames are inserted successively in the carcass of said bird and for retaining the viscera when said carcass is removed from said members.

3. An apparatus for eviscerating a bird, comprising a wire looped frame having a handle and adapted to be inserted in the carcass of the bird, a second wire looped frame, means for holding said second frame stationary, said frames being adapted to interlock with each other to grip the viscera of the bird when the carcass with the first frame inserted therein is placed on the second frame, and to retain the viscera when the carcass is drawn off both frames, substantially as hereinbefore set forth.

WILLIAM ROSS CHAMBERLIN ASHBY.